INVENTOR
CHARLES A. JUDSON
JOHN R. READ
& PHILIP E. HUNTER
BY Wilkinson & Mawhinney
ATTORNEYS Patented June 19, 1951

2,557,747

UNITED STATES PATENT OFFICE 2,557,747

SUPPLYING COOLING AIR TO TURBINE DISKS OF GAS-TURBINE ENGINES

Charles Alan Judson, Borrowash, John Radcliffe Read, Duffield, and Philip Edgar Hunter, Chellaston, England, assignors to Rolls-Royce Limited, Derby, England, a British company Application October 13, 1947, Serial No. 779,552
In Great Britain October 2, 1946

Section 1, Public Law 690, August 8, 1946
Patent expires October 2, 1966

4 Claims. (Cl. 60—41)

This invention relates to gas-turbine engines of the kind comprising a compressor-unit, combustion-equipment and a turbine-assembly. An application of the invention is to turbine-engines for aircraft propulsion in which an airscrew or fan is driven by the engine, or the engine functions as a pure jet-propulsion unit. The invention however may have application to any type of gas-turbine engine in which it is desirable to provide for cooling of the turbine-assembly.

According to the present invention, in a gas-turbine-engine, there is provided the combination with a turbine-rotor-assembly having formed in it a passageway for cooling air co-axial with the assembly, of a duct to convey cooling air to said passageway and sealing means arranged between the duct and the turbine-rotor-assembly adapted to permit relative rotation therebetween.

The invention has particular application to multi-stage turbines of the axial type, where, for cooling later stages of the turbine-assembly, it becomes desirable to introduce cooling air from the downstream side of the turbine.

According to a feature of this invention therefore, there is provided in a gas-turbine-engine the combination with a turbine-rotor-assembly having a central passageway formed therein to convey cooling air, of a duct located downstream of the turbine-rotor-assembly to communicate with said passageway, sealing means between said duct and the turbine-rotor-assembly to permit relative rotation therebetween, and means to supply cooling air to said duct which means includes conduits extending through the turbine exhaust assembly.

In applying the invention to a multi-stage turbine of a gas-turbine-engine, the said passageway is formed as a central bore in a low pressure turbine disc to convey cooling air to the space between the said low pressure turbine disc and the next adjacent turbine disc. For example, in applying the invention to a gas-turbine-engine having a two-stage turbine in which one turbine disc is mounted on the other turbine disc by a centrally arranged hollow bolt member, the duct is arranged to convey cooling air to the said hollow bolt member through which it passes into the space between the turbine-discs, and the sealing means is arranged between the duct and the bolt member.

In one construction according to this invention, the sealing means includes an intermediate duct member which communicates by its ends with the duct and the passageway through the medium of sealing bearings and these sealing bearings are preferably arranged to permit relative tilting of the intermediate duct member, the duct and the turbine-rotor-assembly as well as relative rotation between these parts.

The intermediate duct member may, for example, engage by one end in a tubular extension of the duct which tubular extension also receives within it a carbon sealing ring spigotted on the intermediate duct member, and a spring pressed ring which engages the carbon sealing ring to urge it into contact with the spherical surface of a closure plate mounted on the end of the tubular extension, and the carbon sealing ring may be split diametrically to accommodate wear, the parts being held together on the intermediate duct member by means of a spring garter. The other end of the intermediate duct member may engage in the turbine-rotor-assembly through a carbon ring having a part-spherical inner surface which engages a complementary formation on the end of the intermediate duct member, the carbon ring being resiliently received within a recess in the turbine-rotor-assembly. This carbon ring is conveniently split transversely of the turbine rotor axis to facilitate assembly.

Where it is desired to cool the rear face of the turbine-rotor-assembly, a controlled leak of cooling air may be permitted through the sealing bearings.

Embodiments of these and other features of the invention will now be described by way of example as applied to the turbine-rotor-assembly of a gas-turbine-engine having a two-stage turbine. The description has reference to the accompanying drawings in which.

Figure 1:
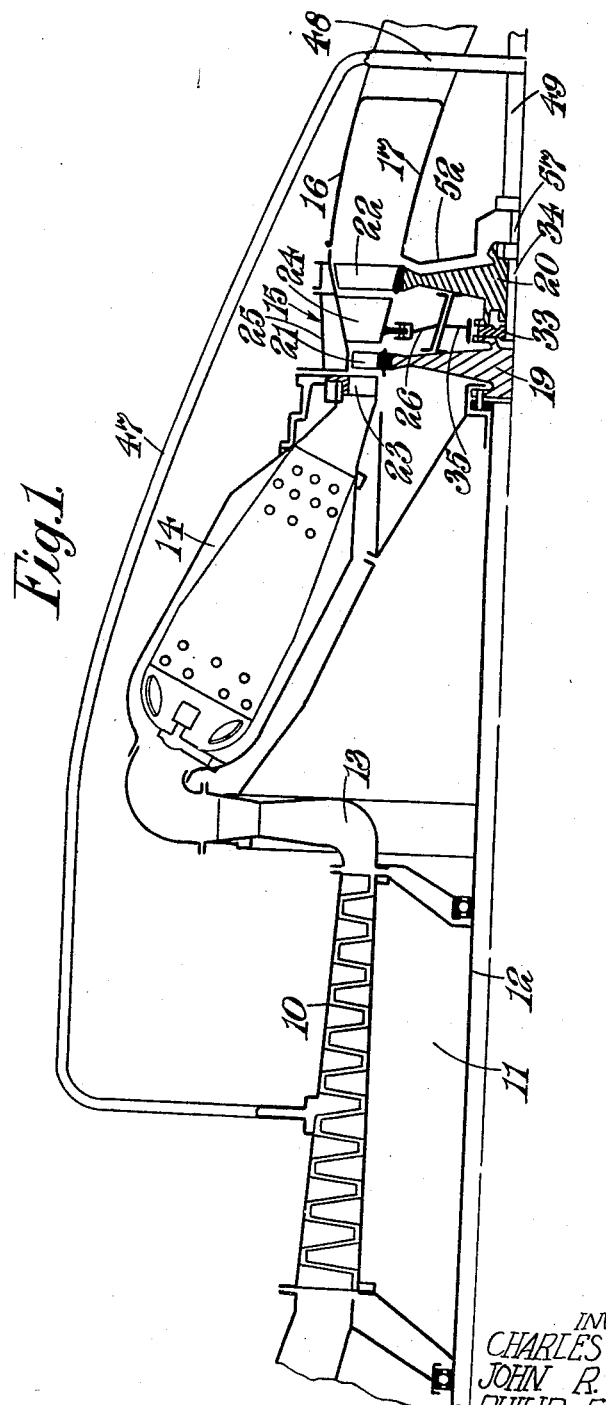
Figure 1 is a diagrammatic section through half of the gas-turbine engine.
Figure 2:
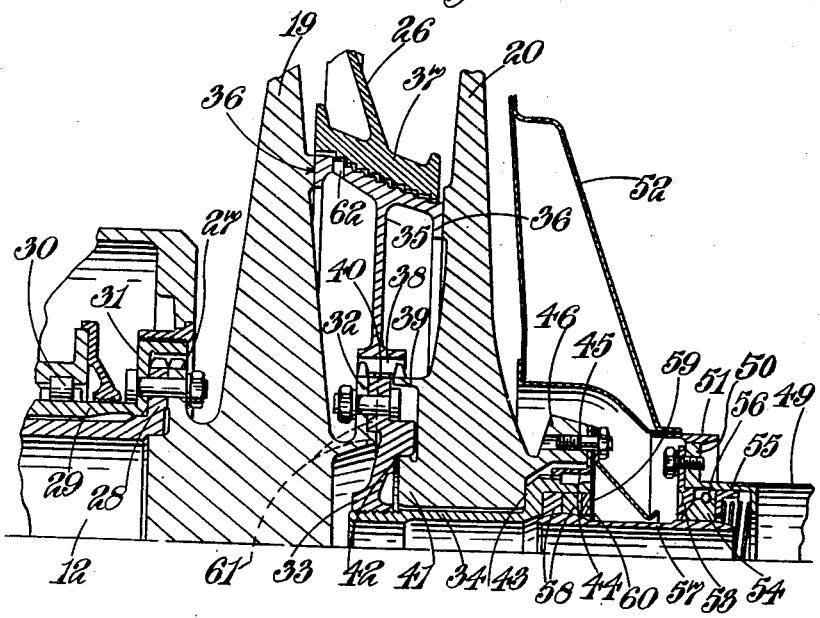
Figure 2 is a fragmentary-section through the turbine-rotor-assembly.

The gas-turbine-engine comprises a compressor 10 the rotor 11 of which is mounted on a shaft 12 and which delivers air through a duct 13 to the combustion equipment 14. The combustion equipment 14 comprises a plurality of combustion chambers, such as that illustrated, disposed in a ring around the shaft 12 between the compressor 10 and a two-stage turbine 15. Fuel is burnt in the air delivered to the combustion equipment and the combustion products pass from the combustion equipment through the turbine to drive it and the turbine in turn drives the compressor through shaft 12. The exhaust gases pass from the turbine 15 into an annular exhaust duct formed between an outer exhaust casing 16 and a centrally-arranged conical member 17.

The turbine comprises a rotor assembly including two turbine discs 19, 20 carrying rotating blades 21, 22 respectively, a fixed nozzle-guide-vane assembly 23 directing the combustion products into the first stage or high-pressure turbine blading 21 and a fixed nozzle-guide-vane assembly 24 intermediate the two turbine stages to direct the gases into the second-stage or low-pressure turbine. The nozzle-guide-vane assemblies 23, 24 are carried by a supporting structure 25. A sealing diaphragm 26 is located between the turbine discs 19, 20 and is supported from the nozzle-guide-vane assembly 24.

The turbine discs 19, 20 are of solid construction in the embodiment illustrated although if desired they may be of a hollow construction.

The disc 19 is designed with thickness appropriate to withstand centrifugal stresses; pure centrifugal stressing considerations may however result in a disc of rather slender cross-section and it is thought that by adopting a turbine rotor construction as described below, the section need not be increased unduly for the purpose of avoiding, by virtue of the strength of the disc alone, dangerous flexural vibrations.

The turbine disc 19 is formed on its forward face (that is the face directed upstream of the flow through the turbine) with a peripherally-toothed, outwardly directed flange 27 by which the disc 19 is bolted to a corresponding flange 28 on the end of shaft 12. The teeth on the flanges 27, 28 engage co-operating teeth on a sleeve 29 supporting the bearing 30 for the rear end of the shaft 12, the sleeve conveniently being provided with a flanged portion 31 to carry the teeth and to permit of its being bolted to the flanges 27, 28.

The turbine disc 19 has formed on its rearward face (that is the face directed downstream of the flow through the turbine) at a radius close to its axis an annular, radially-directed flange 32, and to this flange is bolted and spigotted a flanged nut-like ring member 33.

Within the threaded portion of the nut-like ring member, there is engaged a hollow bolt member 34, which in effect constitutes a shaft-like support for the turbine disc 20. The bolt member 34 is coaxial with the disc 20 and extends through it and the disc 20 is secured in position by screwing the bolt member 34 into the ring nut 33.

A T-sectioned space ring 35 is located between the discs 19, 20 to encircle the bolt member 34. The cross-bar of the T-section is formed with an abutment surface 36 at each end which surfaces bear on corresponding surfaces of the discs 19, 20. The cross-bar is also of frusto-conical form and has its outer surface stepped to co-operate with a correspondingly-shaped flange 37 on the sealing diaphragm 26 to provide a labyrinth seal. The leg of the T-section 35 is formed at its inner radius with inwardly directed splines or teeth 38 which engage corresponding formations on the flange 32 on disc 19 and external splines or teeth formed on an axial flange 39 on the forward face of the disc 20 for transmitting torque between the two discs 19, 20. The leg also carries an inwardly directed formation 40 to seat on the periphery of the ring nut 33 to position the spacer ring in assembly.

The disc 20 also has an abutment on the disc 19 through the ring nut 33. For this purpose, the disc 19 is formed with a spigot-like part 41 which is received in a recess in the ring nut 33 and abuts against a washer 42 accommodated in the bottom of the recess.

It will be seen that when the disc 20 is secured in position on the bolt member 34, it is gripped at an inner radius between the washer 42 and the head 43 of the bolt member and has an abutment at an outer radius against the spacer ring 35. The thickness of the washer 42 is selected to accommodate variations in dimensions of the parts due to machining and so that when the bolt member 34 is screwed into the ring nut 33 by the appropriate amount a desired loading of the discs 19, 20 at their abutment with the spacer ring 35 is obtained. Such an arrangement provides a turbine-rotor-assembly capable of withstanding centrifugal and other stresses arising in operation without dangerous flexural vibrations arising.

A locking device is provided to ensure that the bolt member 34 does not slacken off, which device comprises a ring 44 with an axial extension formed with internal teeth to engage teeth on the periphery of the bolt head 43, the ring being secured by bolts 45 to a flange 46 on the disc 20.

The above described construction of turbine rotor assembly for a multi-stage axial-flow gas-turbine engine is one embodiment of the invention claimed in U. S. Serial No. 779,553, Judson et al., filed 13 October, 1947.

The construction illustrated provides for the supply of cooling air to the space between the turbine discs 19, 20. For this purpose, according to this embodiment of the invention, air is bled off from the compressor 10 at a suitable point and conveyed through a conduit 47 to a point rearwardly of the turbine 15, and then by hollow struts 48 across the annular exhaust duct to an axial centrally disposed tubular member 49 located in the conical structure 17.

The struts 48 conveniently provide the means whereby the conical structure 17 is supported within the casing 16 and are preferably enclosed in fairings of aerofoil cross-section.

The tubular member 49 is part of the fixed engine structure and to convey the cooling air to the interior of the hollow bolt member 34, the following arrangement is adopted.

The tubular member has at its forward end a tubular flanged extension 50 which is slidingly received in a collar 51 carried by the end diaphragm 52 of the conical structure. A ring-like end plate 53 is bolted to the extension 50 and has its rear face formed at its inner radius as a spherical seat to co-operate with a corresponding surface of a carbon sealing ring 54 which is held in contact with the spherical seat by a spring-loaded ring 55 accommodated within the extension 50. The carbon sealing ring 54 is preferably split diametrically to accommodate wear in use and a spring garter 56 is provided to hold the parts together and in contact with the rearward end of an intermediate duct 57 which extends between the tubular member 49 and the bolt member 34.

This arrangement allows relative sliding and canting of the intermediate duct 57 and tubular member 49.

The forward end of the intermediate duct 57 is received in a recess in the bolt head 43 and is formed with a spherical outer surface which co-operates with internal spherical surfaces of a carbon bearing ring 58, which is held in the bolt head 43 by a washer 60 and a spring plate 59 bolted to the flange 46 on the turbine disc 20.

The carbon bearing ring 56 is split transversely to permit assembly and to accommodate wear.

This arrangement permits relative canting of the bolt member 34 and the intermediate duct 57.

It will be appreciated that tubular member 49 is stationary and the bolt member 34 is rotating so that the intermediate duct 57 rotates relative to both, and in use the greater part of the relative rotation occurs between the rearward end of the intermediate duct 57 and the carbon sealing ring 54.

The greater portion of air flowing into the intermediate duct 57 from the tubular member 49 passes into the hollow bolt member 34, but a small leak is permitted at the carbon sealing ring 54 and bearing ring 56 to provide cooling air for the rear face of disc 20.

The air flows into the space between disc 19 and ring nut 33 and then through radial channels 61 cut in the spigot on the flange 32 and in the ring nut 33 to between the spacer ring 35 and disc 19. The cooling air then passes through ports 62 into the labyrinth seal, the ports 62 being positioned to meter the air to both the rear face of disc 19 and the forward face of disc 20. The air also cools the roots of the vanes in the guide-vane assembly 24 and the roots of the second-stage turbine blading 22.

Figure 3:
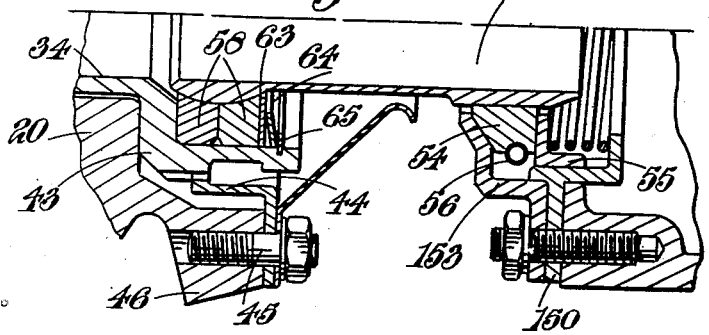
Figure 3 is a view showing a slightly modified construction of part of Figure 2.

Referring to Figure 3, there is illustrated a slightly modified construction of the interconnection between the tubular member 49 and the hollow bolt member 34. In this construction, the carbon bearing rings are retained in position by means of a packing washer 63, a spring washer 64 and a "circlip" 65 and the open end of the tubular member 49 has bolted to it a recessed plate 150 accommodating the spring-loaded ring 55 and a recessed end plate 153 accommodating the carbon sealing ring 54.

We claim:

1. An axial flow turbine arrangement comprising a turbine casing; a turbine rotor assembly rotatably mounted in the casing, said turbine rotor assembly comprising a plurality of axially spaced blade-carrying discs including an axially bored disc, a nut member coaxial with the discs and a shaft-like bolt member extending through the axially bored disc to engage with said nut member to support said axially bored disc, there being a bore extending through the bolt member to form an axial passageway centrally of the rotor assembly, said bore having outlets to the space between adjacent discs and an inlet thereto in the exhaust side of the turbine rotor; an exhaust assembly carried on the outlet side of the turbine casing, said exhaust assembly comprising an outer annular wall and an annular inner coaxial wall defining between them an annular exhaust passage; and means to convey cooling air to said axial passageway in the rotor assembly comprising conduit means including a first conduit portion extending across the annular exhaust passage from outside said outer wall to within said inner wall, and a second and fixed conduit portion connected to said first conduit portion and supported within said inner annular wall coaxially with the rotor assembly, said second conduit portion having its outlet end located adjacent the exhaust side of said rotor assembly, and gas sealing means interconnecting said second conduit portion with said rotor in a manner permitting rotation of the turbine rotor assembly relative to said second conduit portion and providing a passage for conveying cooling air from the fixed conduit element into said axial passageway in the turbine rotor and means to supply cooling air to the said conduit means from outside said outer wall.

2. An axial-flow turbine arrangement comprising a turbine casing, a turbine-rotor-assembly rotatably mounted in the casing, said turbine-rotor-assembly comprising a plurality of coaxial, axially-spaced, blade-carrying discs whereof one disc at least is formed centrally with an axial bore, a shaft-like bolt member extending through said axial bore, a nut member coaxial with the discs, said bolt member having threaded engagement with the nut member, one of said members being rigidly connected with a second disc so that the nut and bolt members support said bored disc from said second disc, said bolt member having a bore extending through it coaxial with the discs, an exhaust-assembly carried on the outlet side of said turbine casing, said exhaust-assembly comprising an outer wall and an inner coaxial wall defining between them an annular exhaust passage, and means to convey cooling air to said axial bore in the bolt member comprising conduit means extending across the annular exhaust passage from outside said outer wall to within said inner wall and having a fixed conduit element supported within said inner wall to be coaxial with the turbine discs, said conduit element having its outlet end located adjacent the exhaust side of the turbine-rotor-assembly, gas-sealing means interconnecting said fixed conduit element with said turbine-rotor-assembly in a manner permitting relative rotation of said fixed conduit element and said turbine-rotor-assembly and providing a passage for conveying cooling air from the fixed conduit element into said axial bore in said bolt member, and means to supply cooling air to the conduit means from outside said outer wall of the exhaust assembly.

3. An axial-flow turbine arrangement comprising a turbine casing, a turbine-rotor-assembly rotatably mounted in the casing, said turbine-rotor-assembly comprising a plurality of coaxial, axially-spaced, blade-carrying discs whereof one disc at least is formed centrally with an axial bore, a shaft-like bolt member extending through said axial bore, a nut member coaxial with the discs, said bolt member having threaded engagement with the nut member, one of said members being rigidly connected with a second disc so that the nut and bolt members support said bored disc from said second disc, said bolt member having a bore extending through it coaxial with the discs, an exhaust assembly carried on the outlet side of said turbine casing, said exhaust assembly comprising an outer wall and an inner coaxial wall defining between them an annular exhaust passage, and means to convey cooling air to said axial bore in the bolt member comprising conduit means extending across the annular exhaust passage from outside said outer wall to within said inner wall and having a fixed conduit element supported within said inner wall to be coaxial with the turbine discs, said conduit element having its outlet end located adjacent the exhaust side of the turbine-rotor-assembly, a duct element extending from the outlet end of said conduit element to the inlet end of said axial bore in the bolt member, gas-sealing-bearing elements between said duct element and said conduit element and between said duct element and said turbine-rotor-assembly so that the turbine-rotor-assembly can rotate relative to the fixed conduit element and so that cooling air can be conveyed from the conduit element through said duct element into the axial bore in the bolt member, and means to supply cooling air to the conduit means from outside said outer wall of the exhaust-assembly.

4. An axial flow turbine arrangement comprising a turbine casing; a turbine rotor assembly rotatably mounted within said turbine casing and comprising a high pressure blade-carrying disc, a coaxial low pressure blade-carrying disc, axially spaced from said high pressure disc, said low pressure disc being formed centrally with an axial bore, a nut member located between the discs and secured to the high pressure disc to be coaxial with the discs, a shaft-like bolt member extending through the axial bore in the low pressure disc and having a head in abutment with the low pressure side of the low pressure disc and a shank having threaded engagement with the nut member whereby the low pressure disc is supported from the high pressure disc, said shaft-like bolt member being bored to provide an axial passageway running therethrough, said axial passageway having a portion of increased diameter in said head to form an axially-facing shoulder in the head, there being outlet ports from said axial passageway to the space between said high pressure disc and said low pressure disc; an exhaust assembly supported from the turbine casing and comprising an outer annular wall and a coaxial inner annular wall defining between them an annular exhaust passage; conduit means having a first conduit portion extending across said exhaust passage from outside said outer annular wall to within said inner annular wall, and a second and fixed conduit portion connected to said first conduit portion and supported within said inner annular wall coaxially with said blade-carrying discs, said conduit means affording a passage for cooling air from outside said outer wall to adjacent the rear surface of the low pressure disc; and gas sealing means interconnecting said second conduit portion with said turbine rotor assembly in a manner permitting rotation of said turbine rotor assembly relative to said second conduit portion and providing a passage for conveying cooling air from the second conduit portion to said axial passageway in said bolt member; and means to supply cooling air to the conduit means connected thereto outside said outer annular wall.

CHARLES ALAN JUDSON.
JOHN RADCLIFFE READ.
PHILIP EDGAR HUNTER.

REFERENCES CITED

The following references are of record in the file of this patent:

UNITED STATES PATENTS

| Number | Name | Date |
|---|---|---|
| 2,241,782 | Jendrassik | May 13, 1941 |
| 2,401,826 | Halford | June 11, 1946 |
| 2,404,334 | Whittle | July 16, 1946 |
| 2,418,967 | Clark | Apr. 15, 1947 |
| 2,427,614 | Meier | Sept. 16, 1947 |
| 2,438,998 | Halford | Apr. 6, 1948 |
| 2,470,780 | Ledwith | May 24, 1949 |

FOREIGN PATENTS

| Number | Country | Date |
|---|---|---|
| 319,622 | Great Britain | Dec. 18, 1930 |